June 2, 1925.  
W. S. REED  
COUPLING  
Filed Dec. 10, 1924
1,540,281
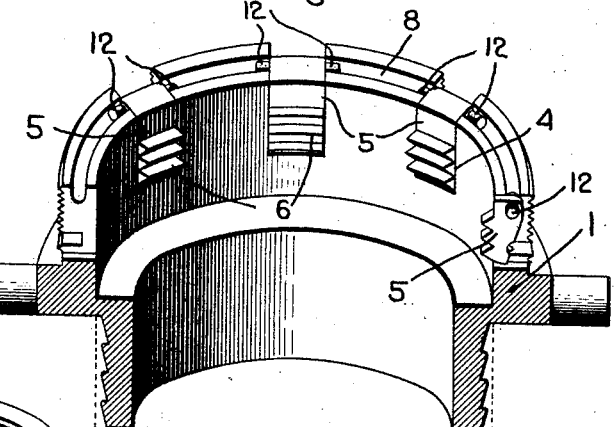
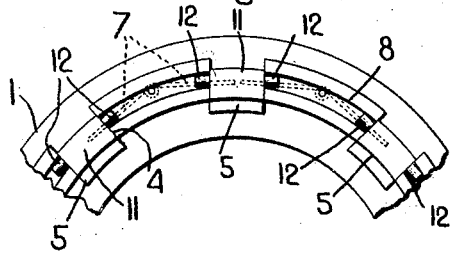
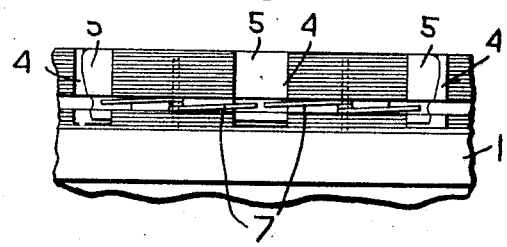
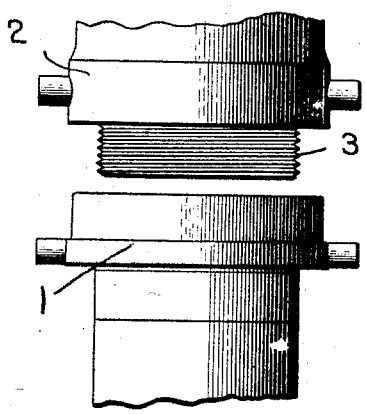
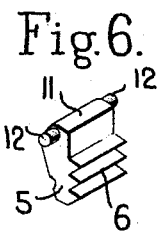
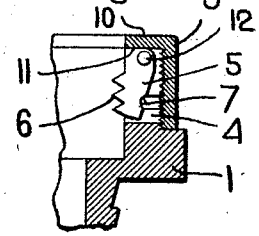
Inventor.  
William S. Reed  
by Heard Smith & Tennant  
Attys.

Patented June 2, 1925.

1,540,281

UNITED STATES PATENT OFFICE.

WILLIAM S. REED, OF LEOMINSTER, MASSACHUSETTS.

COUPLING.

Application filed December 10, 1924. Serial No. 754,955.

*To all whom it may concern:*

Be it known that I, WILLIAM S. REED, a citizen of the United States, and resident of Leominster, county of Worcester, State of Massachusetts, have invented an Improvement in Couplings, of which the following description, in connection with the accompanying drawing, is a specification, like characters on the drawing representing like parts.

This invention relates to hose couplings and particularly to hose couplings of the type illustrated in my Patent No. 910,416, January 19th, 1909. The device illustrated in said patent comprises a hose coupling, the female member of which is provided with swinging jaws, each having screw threads formed on its face, said jaws being constructed so as to permit the two members of the coupling to be quickly coupled by merely inserting the male member into the female member but operating to prevent separation of said members except by unscrewing them. In the device shown in said patent also the construction is such that the longitudinal strain on the jaws comes entirely on the pivot pins of the jaws.

It is one of the objects of my present invention to provide a coupling of this type in which the pivoted gripping jaws are readily removable and are so mounted that the longitudinal thrust or strain to which they are subjected when the coupling is in operation is resisted by a thrust ring instead of by the pivotal connections.

Other features of the invention relate to various improvements in couplings of this type all as will be more fully hereinafter set forth.

In the drawings:

Fig. 1 is a sectional perspective view of a coupling member having my improvements applied thereto;

Fig. 2 is a partial plan view;

Fig. 3 is a fragmentary side view;

Fig. 4 shows the two coupling members separated and about to be coupled;

Fig. 5 is a fragmentary sectional view through the wall of the coupling member showing the manner in which the thrust ring resists the longitudinal strain on the pivoted jaws;

Fig. 6 is a perspective view of one of the jaws;

Fig. 7 is a perspective view of the thrust ring with a portion broken out;

The complete coupling comprises two members 1 and 2, the member 2 having the exteriorly screw-threaded portion 3 which is adapted to screw into the member 1. The improvements relate to the construction of the coupling member 1. This member has formed in its walls a plurality of slots 4 in which are pivotally mounted dogs or jaws 5, each jaw having screw teeth 6 formed on its face adapted to engage the screw threads 3 of the member 1 and being pivotally mounted at its end. Each dog is also acted upon by a suitable spring which tends to swing it inwardly as shown in Figs. 1 and 5. These springs are illustrated at 7 and each dog is provided on its rear face with a groove or recess in which the spring is received.

The two coupling members 1 and 2 are coupled together by simply inserting the screw-threaded portion 3 of the member 2 into the member 1. During this movement the dogs or jaws 5 are forced back against the action of the spring 7 and when the members are completely coupled the toothed faces 6 of the jaws engage the screw threads 3 and thus lock the two members together all as shown and described in my above-mentioned patent. This provides a coupling which can be quickly coupled together.

With this construction any longitudinal strain tending to separate the coupling members is transmitted to the dogs or jaws 5 and one feature of the present invention relates to a novel construction by which the pivotal supports for these dogs will be free from any such longitudinal strain thereby obviating the possibility that such pivotal supports may become bent or distorted by such strain.

The coupling member 1 is formed at its end with open recesses in which the pivotal supports for the jaws 5 are received, said recesses being so shaped in Fig. 1 that they form an annular groove 8, and said coupling member 1 has screw-threaded thereto a thrust ring 9 having a flange portion 10 that overlies and closes the open groove 8. The jaws 5 are so constructed that the ends 11 thereof bear against the flange 10 of the thrust ring so that all the strain to which the jaws are subjected is transmitted directly from the jaw to the thrust ring.

The pivotal support for the jaws 5 may assume various constructions without departing from the invention. In Fig. 6 the jaw is shown as having two trunnions 12 integral therewith, said trunnions resting in the open groove 8 as shown in Fig. 2. These trunnions form a pivotal support for the jaw and permit the jaw to swing as necessary in coupling the two coupling members together but as the end 11 of the jaw bears against the flange 10 of the thrust ring the trunnions are relieved entirely from any strain tending to separate the coupling members. This strain is borne entirely by the thrust ring which can be made sufficiently strong for this purpose. The free swinging movement of the jaws, therefore, can never be effected by any strain to which the coupling member is subjected when in use.

Another advantage resulting from this structure is that it simplifies the manufacture. The single groove which can be made at one operation forms the means for holding the trunnions of all the jaws, and, therefore, the necessity of the separate operations for securing each jaw in place is avoided.

It will be noted that the trunnions 12 are located near the back of each dog while the teeth 6 are on the inner face. When the parts are assembled the teeth 6 are at a less radial distance from the center of the coupling than the trunnions 12. This has the advantage that the longitudinal strain on the jaws when the coupling is fully coupled is such as to tend to swing the jaws inwardly and thus cause to grip the screw threads 3 more firmly.

I claim.

1. A coupling member comprising a circular body provided with slots in its walls, a pivoted jaw occupying each slot, each jaw having integral therewith trunnions on which it is pivoted and said body having recesses in its end face in which the trunnions are loosely received, and a thrust ring detachably secured to the body and closing the open side of the recesses and against which the jaws abut, said thrust ring functioning both to retain the jaws in place and to take the longitudinal thrust to which the jaws are subjected, and said recesses being open to permit the ready removal of the jaws when the thrust ring is removed.

2. A coupling member comprising a circular body provided with slots in its walls and also provided with an annular groove in its end, a pivoted jaw occupying each slot, a pivotal support for each jaw located in said groove, springs carried by the body and engaging the pivoted jaws and tending to force them inwardly and a thrust ring detachably secured to the body and closing the open side of said groove and against which the ends of the jaws abut, said thrust ring functioning both to retain the jaws in place and to take the longitudinal thrust to which the jaws are subjected.

3. A coupling member comprising a circular body provided with slots in its walls and also provided with an annular groove in its end, a pivoted jaw occupying each slot, each jaw having sections of a screw thread on its face and having integral therewith trunnions which are loosely received in said groove, and a thrust ring screwed to the body and closing the open side of the groove and against which the ends of the jaws abut, said thrust ring functioning both to retain the jaws in place and to take the longitudinal thrust to which the jaws are subjected.

4. A coupling member comprising a circular body provided with slots in its walls and also provided with an annular groove in its end, a pivoted jaw occupying each slot, each jaw having at its inner end teeth adapted to engage the exterior screw threads of a complemental coupling member and having at its outer end trunnions integral therewith which are loosely received in said groove and a thrust ring screwed to the body and closing the open side of the groove and against which the ends of the jaws abut, said thrust ring functioning both to retain the jaws in place and to take the longitudinal thrust to which the jaws are subjected, each jaw having a groove in its rear face and springs engaging said grooves and tending to force the jaws inwardly.

5. A coupling member comprising a circular body provided with slots in its walls and also provided with an annular groove in its end, a pivoted jaw occupying each groove, each jaw having near its outer end a trunnion integral therewith which is loosely received in the groove and having teeth on its inner face adapted to engage the exterior screw threads of a complemental coupling member, the trunnions being located at a greater radial distance from the center of the coupling than the teeth and a thrust ring screwed to the body and closing the open side of the groove and against which the jaws abut.

In testimony whereof I have signed my name to this specification.

WILLIAM S. REED.